(12) United States Patent
Miller (10) Patent No.: US 9,496,993 B1
(45) Date of Patent: Nov. 15, 2016

(54) NOISE ANALYSIS TO REVEAL JITTER AND CROSSTALK'S EFFECT ON SIGNAL INTEGRITY

(71) Applicant: Teledyne LeCroy, Inc., Thousand Oaks, CA (US)

(72) Inventor: Martin T. Miller, Chester, NY (US)

(73) Assignee: Teledyne LeCroy, Inc., Thousand Oaks, CA (US)

( * ) Notice: Subject to any disclaimer, the term of this patent is extended or adjusted under 35 U.S.C. 154(b) by 934 days.

(21) Appl. No.: 13/739,106

(22) Filed: Jan. 11, 2013

Related U.S. Application Data (60) Provisional application No. 61/586,341, filed on Jan. 13, 2012, provisional application No. 61/586,348, filed on Jan. 13, 2012.

(51) Int. Cl.
*H04L 1/20* (2006.01)

(52) U.S. Cl.
CPC ..................... *H04L 1/205* (2013.01)

(58) Field of Classification Search
USPC .......................................................... 702/66
See application file for complete search history.

(56) References Cited

U.S. PATENT DOCUMENTS

| | | | |
|---|---|---|---|
| 6,151,010 A | 11/2000 | Miller et al. | |
| 6,195,617 B1 | 2/2001 | Miller | |
| 6,311,138 B2 | 10/2001 | Miller | |
| 6,539,318 B2 | 3/2003 | Miller et al. | |
| 6,791,545 B2 | 9/2004 | Miller et al. | |
| 6,965,383 B2 | 11/2005 | Ritter et al. | |
| 7,310,392 B2 | 12/2007 | Miller | |
| 7,434,113 B2 | 10/2008 | Miller et al. | |
| 7,437,624 B2 * | 10/2008 | Miller .................. | G01R 13/345 702/66 |
| 7,505,039 B2 | 3/2009 | Campiche et al. | |
| 7,516,030 B2 | 4/2009 | Miller | |
| 7,519,874 B2 | 4/2009 | Salant et al. | |
| 7,899,638 B2 | 3/2011 | Miller | |

OTHER PUBLICATIONS

Agilent technologies, Clock Jitter Analysis with femto-second resolution. Copyright 2008 Agilent Technologies, Inc., 52 pages.*
Vladimir Dmitriev-Zdorov, The Jitter-Noise Duality and Anatomy of an Eye Diagram, DesignCon 2014, 29 pages.*

* cited by examiner

*Primary Examiner* — Tung Lau
(74) *Attorney, Agent, or Firm* — Andrew Dommer

(57) ABSTRACT

A method and apparatus for generating a probability density function eye are provided. The method preferably includes the steps of acquiring an input waveform, performing a clock data recovery in accordance with the input waveform to determine one or more expected transition times and defining a plurality of unit intervals of the input waveform in accordance with the one or more expected transition times. One or more values of one or more data points may then be determined in accordance with the input waveform in accordance with the one or more expected transition times, and a category for each unit interval in accordance with its state and its position within the input waveform may also be determined. One or more histograms may then be generated for the determined one or more values for each category of unit intervals.

18 Claims, 13 Drawing Sheets

NOISE ANALYSIS TO REVEAL JITTER AND CROSSTALK'S EFFECT ON SIGNAL INTEGRITY

CROSS REFERENCE TO RELATED APPLICATIONS

This application claims the benefit of U.S. Provisional Patent Application 61/586,341, filed Jan. 13, 2012 titled "Noise Analysis to reveal Crosstalk's effect on overall "Signal Integrity"" to Miller; and U.S. Provisional Patent Application 61/586,348, filed Jan. 13, 2012 titled "Noise Analysis to reveal Crosstalk's effect on overall "Signal Integrity"" to Miller, the contents of these applications being incorporated herein by reference.

FIELD OF THE INVENTION

The invention concerns the analysis of Signal Integrity in the field of digital data communication and digital electronics in general. Specifically within this field, the invention concerns jitter, noise and crosstalk analysis and is related to a method and apparatus for evaluating jitter (or timing uncertainty) and noise (voltage uncertainty) performance of a data channel or clock under observation.

BACKGROUND OF THE INVENTION

In present day, Signal Integrity analysis is concerned with jitter (timing uncertainties) and noise (voltage uncertainties) performance of data channel(s) or clock circuits. These two dimensions, in which the electronic data channel or clock manifests are equally important and excessive jitter or noise can lead to data channel malfunction. The two phenomena are actually intertwined as increased noise generally leads to increased jitter, and jitter can result in increased noise.

This kind of analysis and investigation is generally categorized as signal integrity (SI) analysis. In recent history, most of the SI focus has been on jitter analysis. Much work has been done to devise methods (prior art) to decompose jitter into component parts which permit a better understanding of the nature of this "uncertainty in timing" we call jitter. Some attention has been paid to similar decomposing the noise of the same circuits, but this area has so far been underexploited.

Furthermore as more and more serial data channels are packed into close proximity the issue of "crosstalk" or unwanted interference between circuits has become a recognized problem to be addressed. There are a number of ways that this unwanted interference can affect and impair the performance, depending on the physics of the interference. One such mechanism is electromagnetic coupling. That is the propagation of fields arising from the rapidly changing currents in printed circuit conductors. The principle manifestation of "crosstalk" of this kind is "noise" by nature. "Noise" may be defined as any undesired pollution of a transmitted signal due to electronic noise (as defined in the industry) intrinsic to a data channel's circuitry, but including any effects induced by neighboring active signals, whether they are other data channels, or simply other dynamic electronic signals (or voltage sources) in the vicinity of a data channel under observation. Some "crosstalk" from other signals is understood to be included in the "noise" which can degrade and impair a data channel, and as such is undesirable. In light of the interest in crosstalk, a closer look at noise analysis is a logical extension of SI analysis. "Noise" in general for a data channel will encompass both the intrinsic noise of the channel, as well as any perturbations induced by the aforementioned "crosstalk" from whatever other signals are in the vicinity. To further complicate matters, whatever measurement instrumentation is employed to "observe" the data channel and other neighboring signals has its own "noise" contributions, and this measurement noise is as important to consider as either the intrinsic or the "crosstalk" noise components. To thoroughly dissect and analyze noise and whatever crosstalk may be present, it is important to develop a methodology that provides the most clear characterization of which parts of the "noise" are dependent on the average signal shape, which parts are bounded, which parts are not, and to isolate all that is not systematically related to the signal itself, so that it may be analyzed in relation to candidate crosstalk signals, for the purpose of identifying the source of the crosstalk.

The fundamental nature of an oscilloscope measurement (or waveform recording instrument) is one that "samples" at some nominally uniform time intervals the voltage of a signal which is presented to it. The voltage is a varying function over time for any data channel of interest, but even lacking a data channel, any voltage source has variations over time which are random and which are commonly known as "noise". The sources of noise are rooted in the physics of whatever circuit is being observed. There are many references on this subject easily available in text books and on the Internet.

Figure 1:
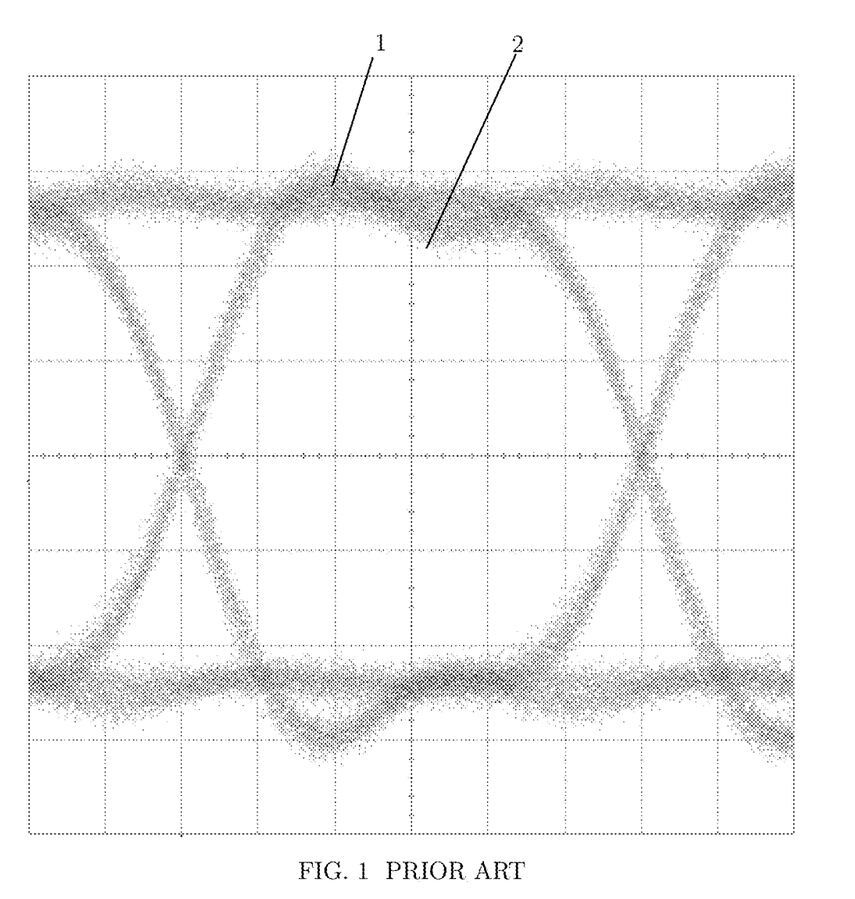
FIG. 1 is an eye diagram containing nine thousand UI according to prior art methods.
Figure 2:
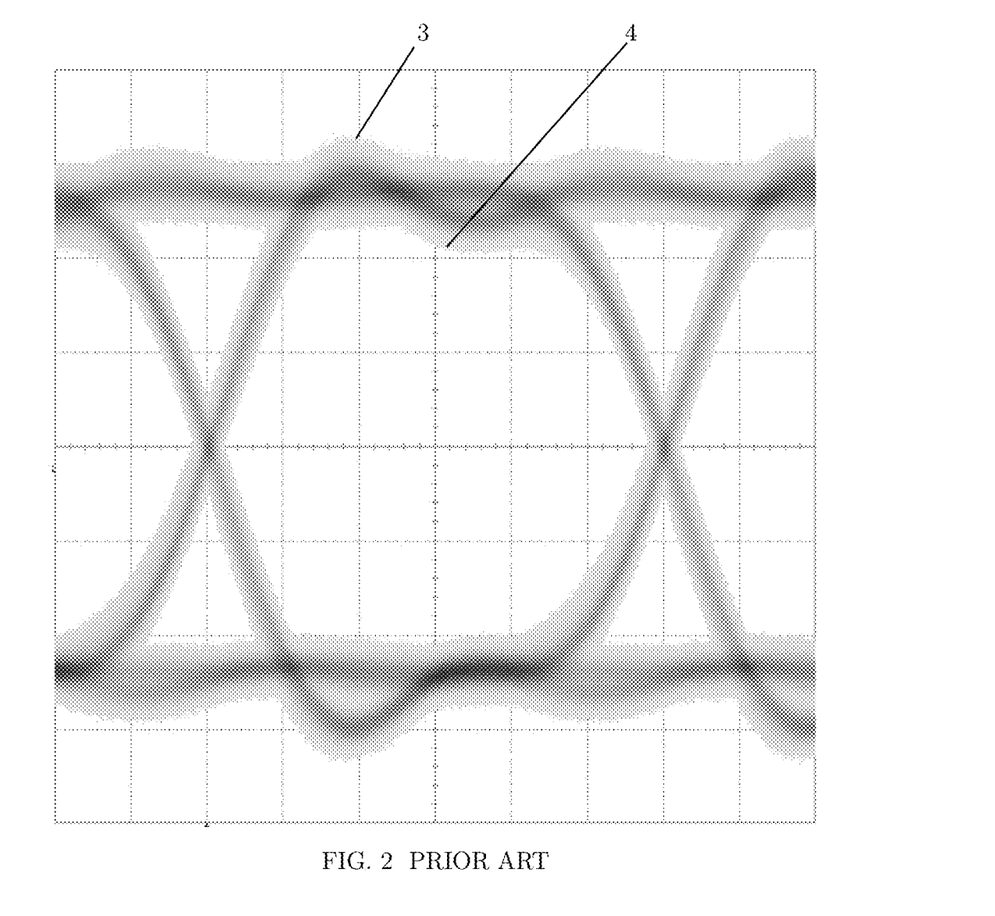
FIG. 2 is an eye diagram containing five million UI according to prior art methods.

A tool commonly used in studying noise and jitter is called an "eye" diagram. Such diagrams have been in existence for many years and offer a 2 dimensional approximation of the "probability density" for the signals under analysis (2D eye diagrams). These 2D eye diagrams have a number of weaknesses which are seldom discussed. One problem is that they continue to change as more and more data contributes to the eye diagram, and there is no easy way to know when you have "enough" data. This evolution of an eye diagram is due to the simple nature of random noise. It is well known in statistics that the expected value of the peak-to-peak of a Gaussian or Gaussian-like distribution of an observed set of events depends on the number of events observed. As more and more events are observed, the width of the observed distribution broadens. For example, FIG. 1 shows an eye diagram with a nine thousand UI eye [1] as it would look after nine thousand unit interval (UI) have been accumulated. Furthermore, FIG. 2 shows an eye diagram with a five million UI eye [3] as it would look after five million UI have been accumulated. As expected the extents of the populated regions of the eye have grown as more UI are accumulated. As such, two eye diagrams from a different number of UI cannot be compared directly.

Often eye diagrams are used to perform a "mask" test, wherein a polygon or polygons are used to define regions of exclusion not to be touched by the points in the eye diagram. The problem of course, is how much data is needed for a valid mask test, because the probability of a mask violation depends on how many chances the signal under test is given to violate the mask. This is fundamentally a consequence of the eye diagram being non-convergent. There are regions of the 5 million UI eye that are impacted [4], whereas for the 9 thousand UI eye the same region is not impacted [2].

One approach to solve this problem is to try to estimate from the eye diagram a "contour plot" or a 2-dimensional representation. The contour plot is a well known concept. It is supposed to represent the absolute probability of the signal under observation to touch a given coordinate in the eye diagram coordinates. Methods for this kind of calculation exist today. For oscilloscopes these methods suffer from ambiguity in calculating probabilities from an already formed eye. In particular in the region of the contributions from rising edges and falling edges contributions to the eye diagram make it impossible to know if the trajectory of the signal under test that produced that point was earlier or later. Furthermore in an already formed eye diagram, the separation of vertical (noise) contributions from horizontal (jitter) is not possible. For example, if one wanted to compensate the eye diagram for the contribution of the measuring instrument's inherent noise, one cannot. Contour plots can also be generated by a Bit Error Rate Tester that is specially equipped for this task. This same shortcoming applies, in that the noise and jitter inherent in the instrument cannot be effectively removed from such a contour plot. It is notable that in the SI analysis prior-art there is a consortium based software tool referred to as "Stat-Eye". This tool can produce eye diagrams based on assumptions about noise and jitter and these objects have a different set of problems while addressing some of the defects in ordinary eye diagrams. These are essentially predictive tools dependent on electronic models and conscious assertions made by the user of the tool.

In general, in current SI analysis, there is no way to independently analyze the spectrum on time-domain of "only" the non-deterministic part of the noise, without the spectrum of the signal itself present in the spectrum.

The inventor of the present invention has determined that both contour plots and eye diagrams would be more useful for comparing test cases where crosstalk is present compared to cases where crosstalk is not present, if the above shortcomings could be overcome. The compensation is important to minimize the impact of the measuring instrument, and improving the quality and precision of the contour plot would be very beneficial.

Current SI methods do permit characterization of a data pattern's systematic trajectory, or shape through every bit or UI of the test pattern. This is accomplished via resampling data to have exactly N resampled points and forming a signal average from these resampled points. Such methods are standard in industry standards serial-attached-SCSI (SAS) for the purpose of estimating total waveform distortion penalty (TWDP). However these methods only supply the shape or trajectory of the signal under test, either as a function of position within a repeating sequence of test data, or as defined by the surrounding local sequence of data states.

Therefore, the inventor of the present invention has determined that what is needed is:
1. A convergent form of the eye diagram. That is one which does not change significantly as more data is accumulated.
2. A means to compensate the eye diagram for the noise inherent in the measuring instrument.
3. A means to overcome the inability of an oscilloscope to produce a contour plot which extends outside the central region of the eye.
4. A means to produce a contour plot which is compensated for the inherent noise of the measuring instrument.
5. Good methods for visualizing effects of crosstalk.

OBJECTS OF THE INVENTION

Among others, it is an object of this invention:
1. To provide a means to produce a convergent form of the eye diagram. That is one which doesn't change significantly as more data is accumulated.
2. To provide for an eye diagram that is compensated for noise inherent in the measuring instrument.
3. To overcome the inability of an oscilloscope to produce a contour plot which extends outside the central region of the eye.
4. To provide a contour plot that is compensated for the inherent noise of the measuring instrument.
5. To provide methods for visualizing effects of crosstalk.

Still other objects and advantages of the invention will in part be obvious and will in part be apparent from the specification and drawings.

SUMMARY OF THE INVENTION

One or more embodiments of the present invention may be provided to overcome the drawbacks of the prior art. To overcome the non-convergence problem, one or more embodiments of the invention preferably break down the analysis of signals under observation first into unit intervals of a clock or data sequence, and then categorize each unit interval as belonging to a category defined in such a way as to group together unit intervals that are very likely to have similar or even identical history, and so may be expected to have a well defined trajectory over the span of the unit interval. For each observed category, at several time intervals within and surrounding the UI (which need not be uniformly spaced) the distribution of vertical (usually voltage) values is preferably captured. The number and precise locations of these distributions is preferably chosen to adequately describe the changes in vertical variations for a category, so that the vertical distributions for the category can be estimated over the entire breadth of a UI as well as regions extending somewhat into adjacent UIs. By treating the categories separately, the nature of the distributions are better constrained and they are much simpler to analyze and parameterize.

Once significant statistical distributions have been captured, and each distribution may be parameterized, and probability density maps may be made for each category. The superposition of all categories or a subset of categories (e.g. all categories with a transition at the start of the UI) can be superimposed to produce a convergent probability distribution function (PDF) map which is a superior eye diagram, the PDF-Eye. In addition since the parameterization of the distributions lends itself to adapting a Gaussian component of the distribution, it can be compensated for the measuring instrument's noise, overcoming the need for additional compensation.

Likewise a probability map (as distinguished from a probability density) may be created from the parameterized distributions from which a superior contour diagram, the cumulative distribution function (CDF)-Eye may be derived. In this way, in accordance with an embodiment of the invention, it is possible to create the probabilities of the signal under test to impact every coordinate on the eye diagram's space, even extending outside the central region of the eye. Again as for the new PDF-Eye the need to compensate for instrument noise is overcome.

Furthermore, using the same inventive strategy for categorization and average values rather than distributions, the creation of a systematic waveform, with sample points at the same times as the captured input waveform can be formed where the non-systematic (random) variations have been removed. Furthermore, in accordance with an alternative embodiment of the invention, the difference between the input waveform and the systematic waveform provides a residual waveform consisting of only the non-systematic part of the signal under observation.

These new kinds of eye diagrams presented in accordance with one or more embodiments of the present invention exist in several varieties as described in this application, and they with the residual and systematic waveforms provide significant means for observing jitter, noise and crosstalk.

In accordance with additional embodiments of the invention, it is further possible to build an apparatus to implement the acquisition, clock recovery, capture of distributions and a processor for processing them with a processor to produce these results and displays.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

For the purposes of this application, the procedures for acquiring digital waveforms, subtracting them if they are differential (i.e. much as the implicit electronic "receiver" would effectively subtract the differential analog counterparts), the detection of transitions for either clock or data, clock data recovery (CDR), digital resampling and are all understood as procedures well known in the prior state of the art. As such these methods do not require further detailed descriptions.

Figure 3:
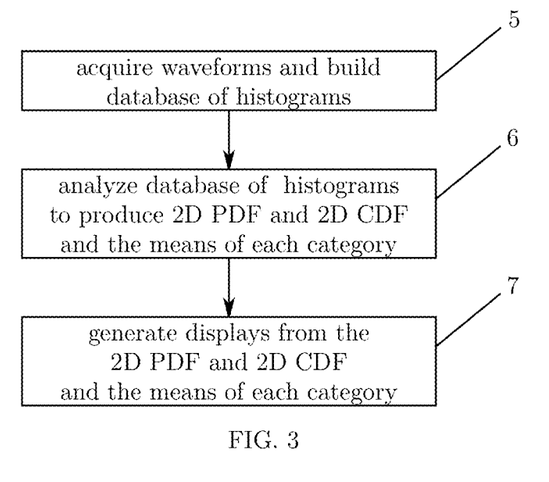
FIG. 3 is the flow diagram of the three major steps in accordance with an embodiment of the preferred embodiment.

The three basic steps of a particular embodiment of the preferred embodiments are shown in FIG. 3. Here we see a first step [5] consisting of the acquisition and analysis of waveforms to produce a database of histograms followed by a second step [6] consisting of the analysis of the database of histograms to produce a 2D PDF object [33], a 2D CDF object [34] and a set of mean values followed by a final step [7] consisting of the generation of displays from the 2D CDF object [34], 2D PDF object [33] and the set of mean values.

Figure 4:
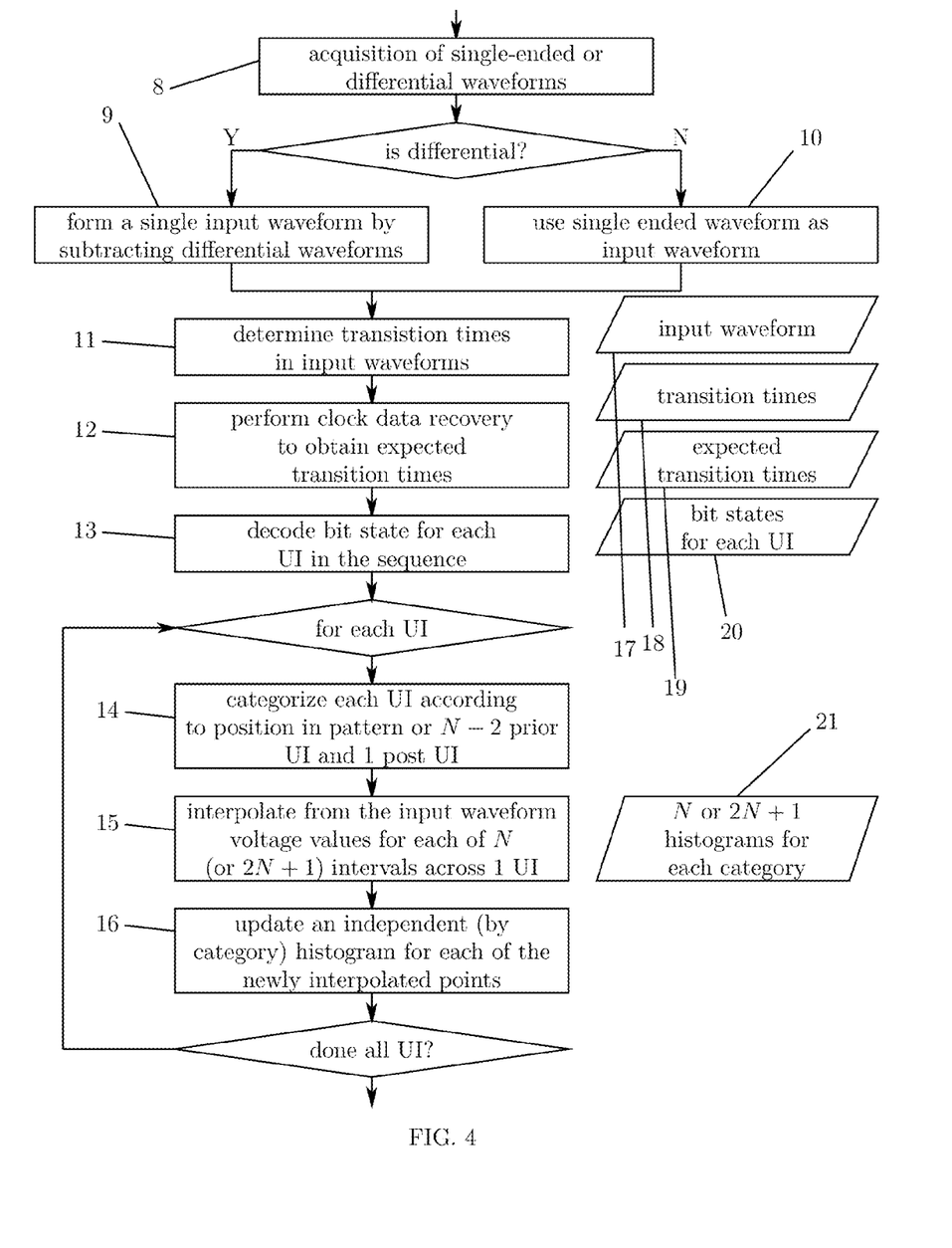
FIG. 4 is a flow diagram showing the steps of acquiring waveforms and building a database of histograms in accordance with an embodiment of the present invention.
Figure 5:
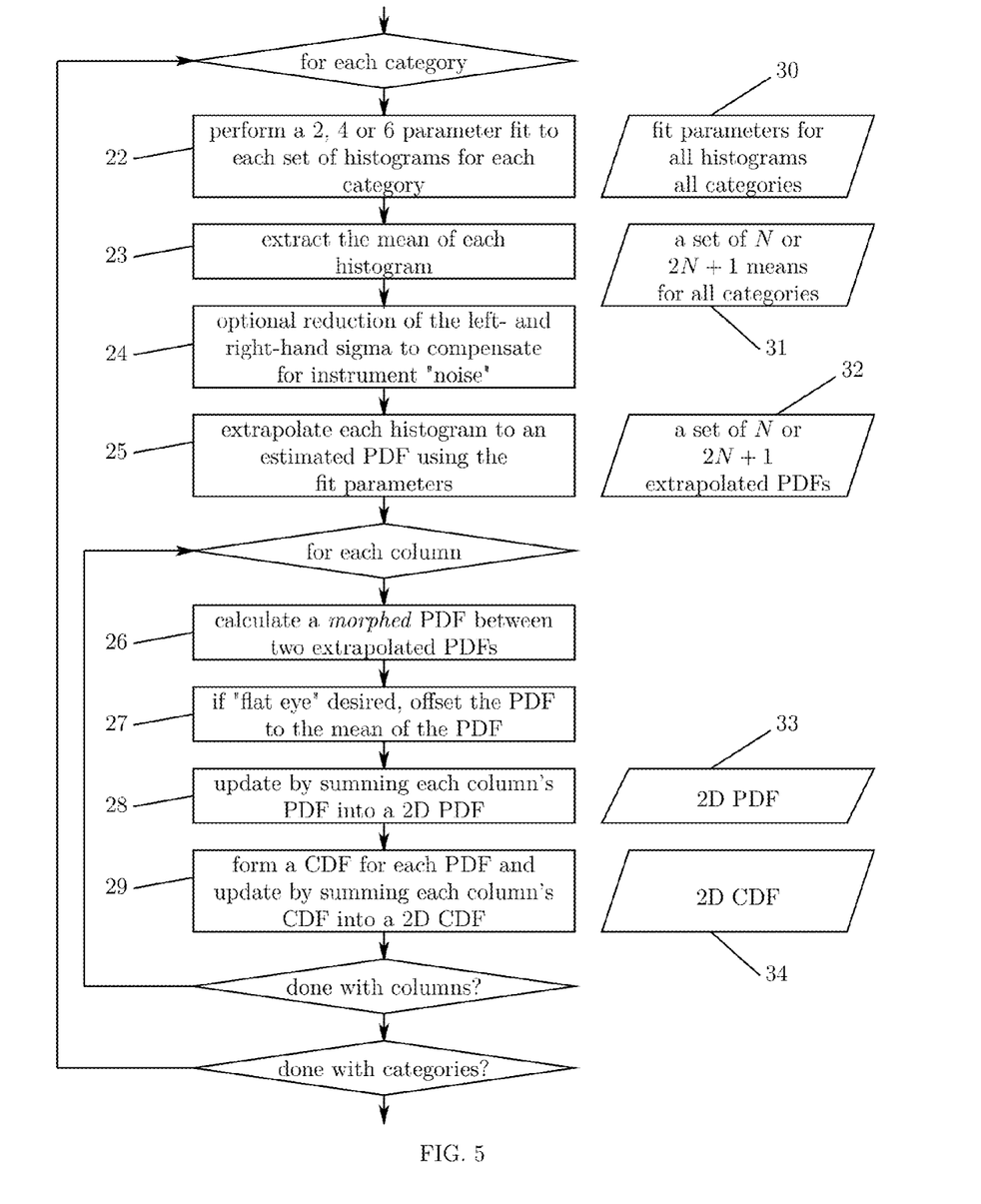
FIG. 5 is a flow diagram showing the steps of analysis of the histogram database in accordance with an embodiment of the invention.

Referring next to FIG. 4 in addition to FIG. 3, during this first step [5], first input waveforms may be acquired [8] and a single input waveform obtained [9] or [10]. Next, the input waveform is preferably analyzed to identify transition times [11]. A CDR procedure may then be performed [12] resulting in the recovered times defining the start and end of each UI in the captured input waveform. Once this is accomplished the next step is preferably to decode the states (1 or 0) for each UI in the waveform [13] producing a list of sequential bit states for the waveform. Two cases must be addressed, the case where there is a repeating pattern in the sequence of states and the case where the is no such repeating pattern. Depending on which case, a categorization method [14] will preferably be either: 1) the category associated with each UI is defined by its position in the repeating pattern, or 2) if there is no repeating pattern, the category for a UI will be defined by an M-bit binary code consisting of the M-2 bits (or other number of bits) prior to the UI, the state of the UI and the state of the following UI (or other predetermined number or portions of UIs).

One purpose of analysis in accordance with the various embodiments of the invention is to uncover any non-systematic behavior, and then to isolate the systematic from the non-systematic. An essential element of these various elements of the invention is to determine the "average" shape of the serial data or to establish the systematic behavior.

Figure 6:
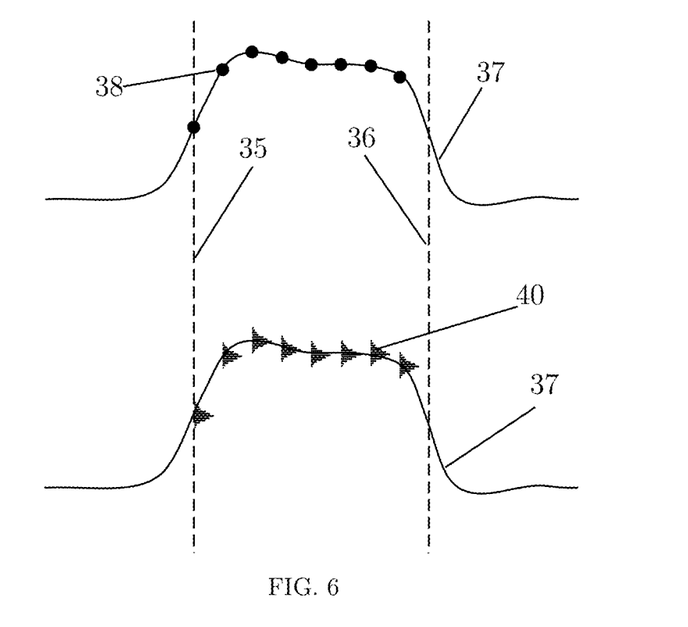
FIG. 6 shows samples and noise histograms across one unit interval in accordance with an embodiment of the invention.
Figure 7:
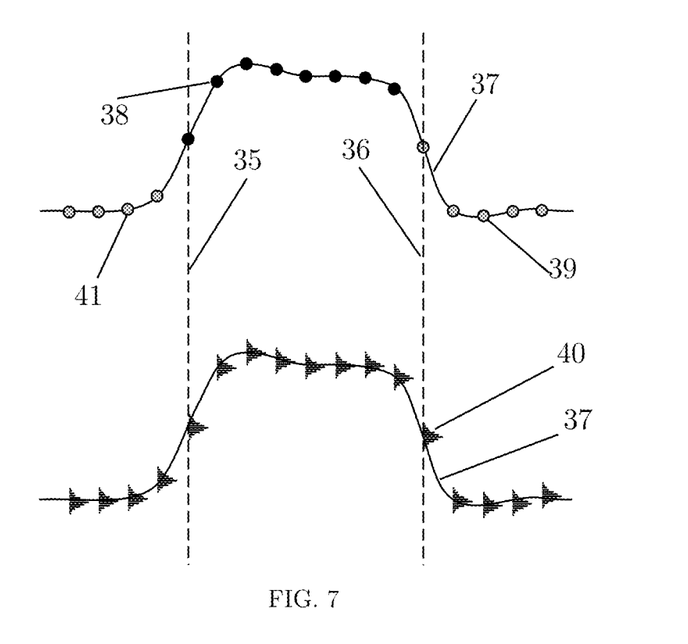
FIG. 7 shows samples and noise histograms across one unit interval in accordance with an embodiment of the invention.

It is well known for the purposes of establishing the shape of the trajectory for both the repeating pattern case and the non-repeating pattern case. For the case of a repeating pattern FIG. 6, for N horizontal intervals across a UI from the start of the UI [35] to the end of the UI [36], only N points [38] are needed, since the points from the previous and next UIs will provide the necessary points before and after the UI in order to reproduce the trajectory of the category over the horizontal extent of the eye. For the non-repeating case FIG. 7, more points are typically needed to establish the average trajectory over the same horizontal extent as the traditional eye. In the preferred embodiment 2N+1 resampled data points are used (although other choices are possible). An additional N/2 points before [41] the UI, N points inside [38] the UI and N/2+1 points after [42] the UI are preferably employed. In this preferred embodiment of the invention, instead of forming a simple average at each of the resampled points, a histogram may be formed [40] for each of the sample points in each category from which an average can later be obtained, but from which much additional information can be gained about the nature of the vertical noise.

Therefore, further in accordance with one or more preferred embodiments of the invention, in order to perform the step of analyzing substantially every UI in the input waveform as described above, N or 2N+1 data points are interpolated from the input waveform [15] and the N or 2N+1 histograms for the category of this UI is updated [16]. A database [21] is formed, including the data point interpolated values, which is organized by the observed categories, and which consist of either N histograms per category, or of 2N+1 histograms per category depending on whether there is or is not a repeating pattern (one for each data point included in the processing, as noted above). Multiple acquisitions may be treated in the fashion described above to accumulate good statistics and for the non-repeating pattern case to allow for rare categories to manifest. Once an adequate amount of data points have been acquired and interpolated, and therefore sufficient data is available to provide meaningful statistics, the generated database of histograms can be analyzed.

One objective of the next major step [6] is to analyze the database of histograms to produce a 2D PDF object [33] and 2D CDF object [34] which comprise inventive, novel forms of eye diagrams and contour plots. These will have the same vertical and horizontal extents as would a traditional eye diagram, and so an estimate of the PDF for each coordinate of that area may be made. Likewise an estimate of the CDF or probability of the signal under observation might pass through any particular selected coordinate may also be made.

Figure 8:
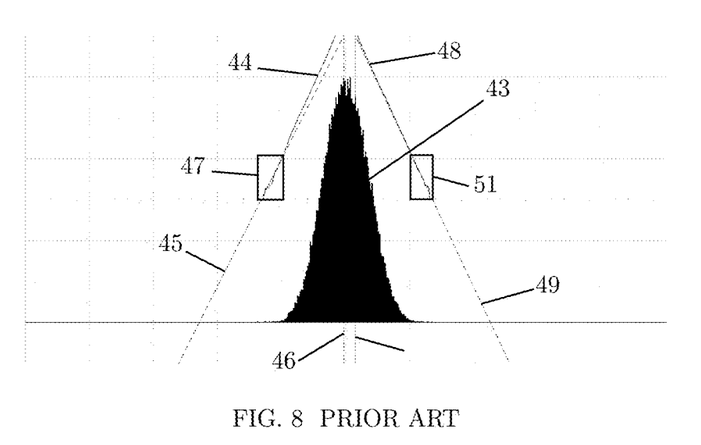
FIG. 8 is a noise histogram according to prior art methods.

There will therefore, be generated a set of histograms for each category [21] Each histogram is fitted, which is by now a well known procedure as shown in FIG. 8, yielding 6 parameters: $\sigma_L, \mu_L, \rho_L, \sigma_R, \mu_R, \rho_R$. The CDF of the histogram is preferably translated to a vertical Q-scale [44] according to the optimized value of $\rho_L$ for which the data in the fit region [47] is most linear. The best fit line [45] has a slope which is the reciprocal of $\sigma_L$, and the intercept [46] at Q=0 of that line yields the value of $\mu_L$. An identical procedure may be performed on the right-hand side of the histogram to obtain $\rho_L$ from optimal linearization of the region [51], to obtain $\sigma_R$ from the slope of the line [49] and to obtain $\mu_R$ from the intercept [48].

For producing the average trajectory per category, the means of all histograms per category are preferably calculated [23].

Optionally, each set of fit parameters may be modified [24] to use a somewhat smaller $\sigma_L$ and $\sigma_R$ reducing them by a quadrature subtraction ($\sigma'_L = \sqrt{\sigma_L^2 - \sigma_{instrument}^2}$) of a known random noise, $\sigma_{instrument}$ contributed by the measuring instrument.

Using these 6 parameters, each histogram can be extrapolated to a PDF [25] (i.e. including one variable, in addition to the extension along the time axis) using the parameters to express the low probability density values at the extremes, and simply interpolating the interior of the histogram to produce a PDF on a scale that matches the vertical extent and granularity of the eye type diagrams to be produced.

The method of "morphing" is well known. A form of morphing is preferably used to transform one fitted histogram to another is applied in order to fill in the space between the N histograms in order to construct a complete picture over the entire horizontal extent of the eye diagram. Of course, other forms of combination of the various resulting histograms may be employed. Once the set of PDFs [32] is calculated, to produce a column for every horizontal coordinate (for every column) of the desired PDF eye object [33] a "morphing" procedure is used [26]. If a flat-eye is desired, the PDFs may then be offset to have zero mean [27]. Next for each category, each column's PDF is summed [28] into a pre-initialized 2D PDF object [33] which is nothing more complicated than a two-dimensional array. Next for each column, the PDF may be integrated or summed to form a CDF.

In accordance with one or more preferred embodiments of the invention, there may be two ways to perform this summing depending on whether the desired final objects are to be "data centric" or "signal centric". The Data Centric method sums in such a way as to calculate the probability that the variations from the trajectory encroach or impact the center of the eye region (where data values are sampled in a real receiver). So in this case the probability of encroachment and therefore impact on the central region of the eye is highlighted, while little interest in the variations away from the center of the eye are considered. The signal centric method calculates the probability of variations away from the mean trajectory. It is interesting that both methods produce the same probabilities in the 2D CDF for the central region. But the signal centric version of the 2D CDF is one that contains information outside the central region of the eye. Both are interesting and may be used and employed in accordance with the various embodiments of the present invention.

Each of these sums is then summed (according to it's frequency of occurrence for the non-repeating case) into the 2D CDF object [34], completing the creation of all three objects of the second step [6] of FIG. 3.

Because each category of UI is analyzed independently, any ambiguity of whether contributions to the 2D CDF are from rising or falling edges is completely avoided. Furthermore both the 2D PDF and the 2D CDF are or can be compensated for the measuring instruments inherent noise.

As more waveforms are added to the procedure, a more precise a fit results, more accurately reflecting the underlying statistics of the observed noise. Consequently the estimate of the shape of each one dimensional PDF is convergent, which means the resulting 2D PDF object [33] and 2D CDF object [34] are also both convergent.

Figure 9:
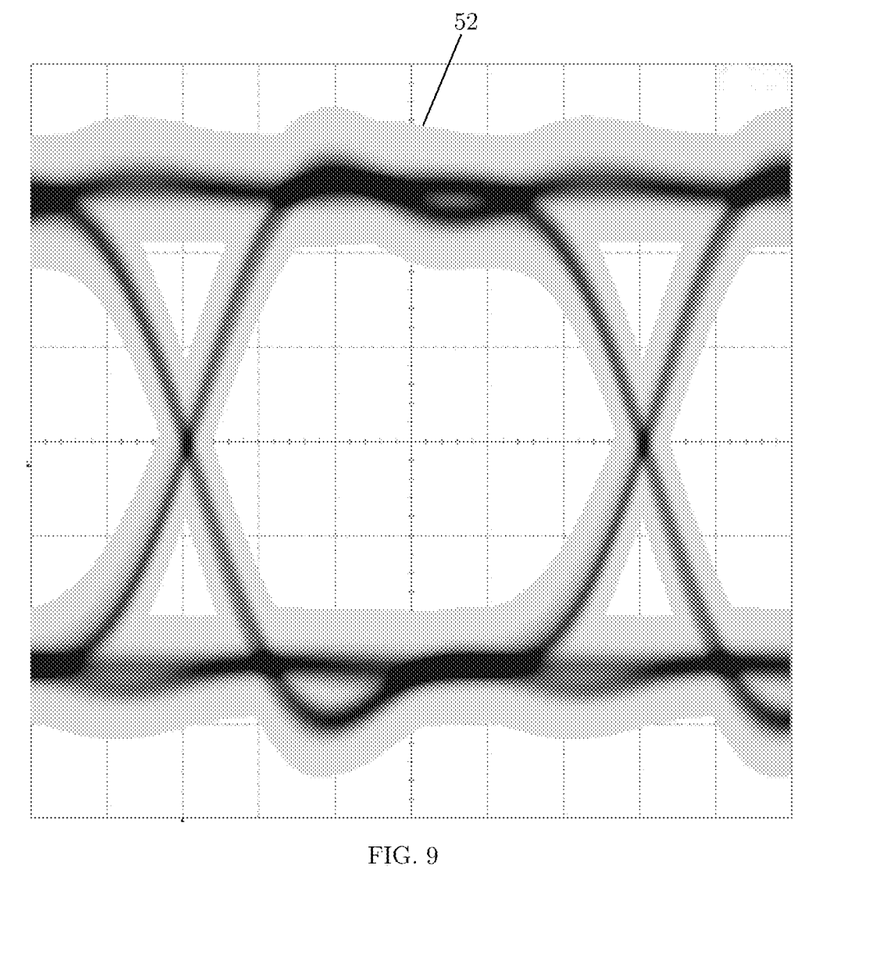
FIG. 9 is a PDF eye diagram according to an embodiment of the present method.

Next the third step [7] in FIG. 3, is to create displays from the objects created in the previous step. To preface these remaining steps, creating "eye-like" views is possible once the 2D PDF and the 2D CDF are calculated. The first such display is the PDF-eye [52] shown in FIG. 9. This PDF-eye [52] is preferably calculated from the 2D PDF and using known display techniques while stopping the translation to color at some minimum probability density (e.g. 1.0e-30 for this particular exemplary case). This PDF-eye [52] is convergent and would appear virtually unchanged for one hundred million UI as it would for one million UI.

Figure 10:
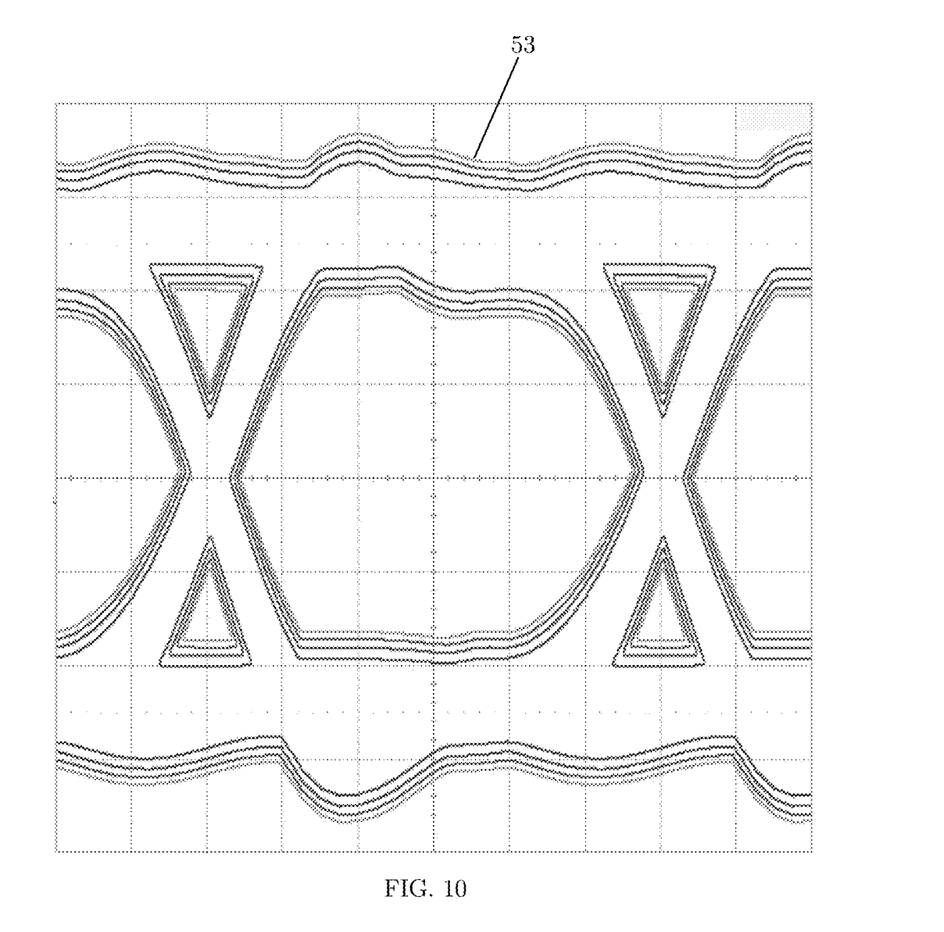
FIG. 10 is a contour plot containing lines of constant probability according to an embodiment of the present method.
Figure 11:
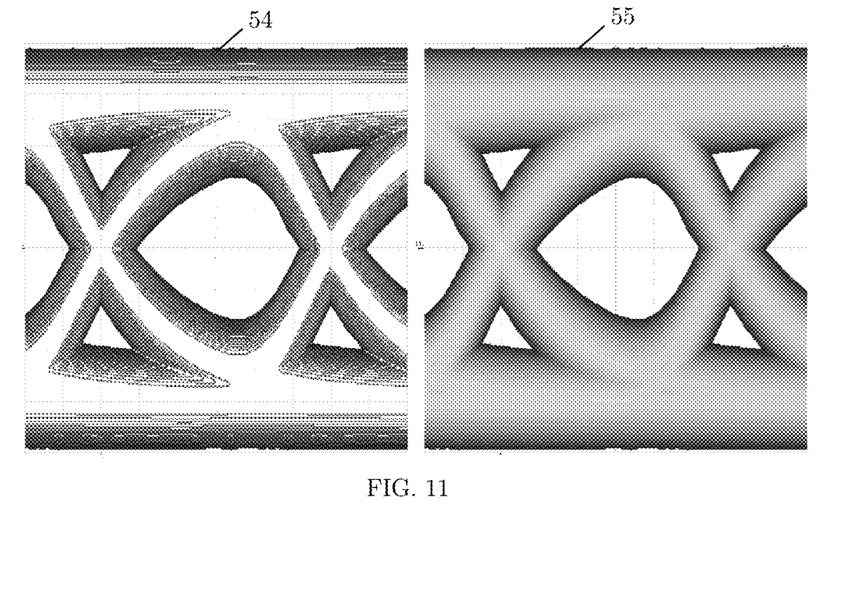
FIG. 11 is a pair of plots containing a signal centric iso-BER plot and a signal centric contour plot in accordance with an embodiment of the invention.
Figure 12:
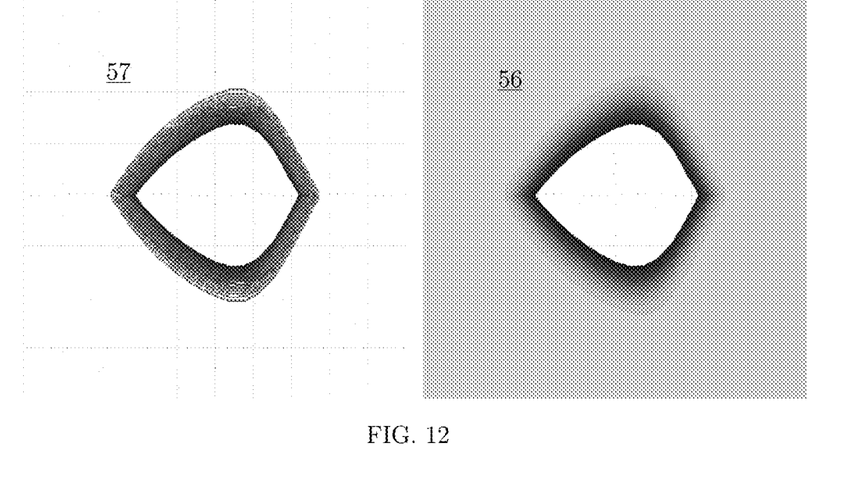
FIG. 12 is a pair of plots containing a data centric iso-BER plot and a data centric contour plot in accordance with an embodiment of the invention.
Figure 13:
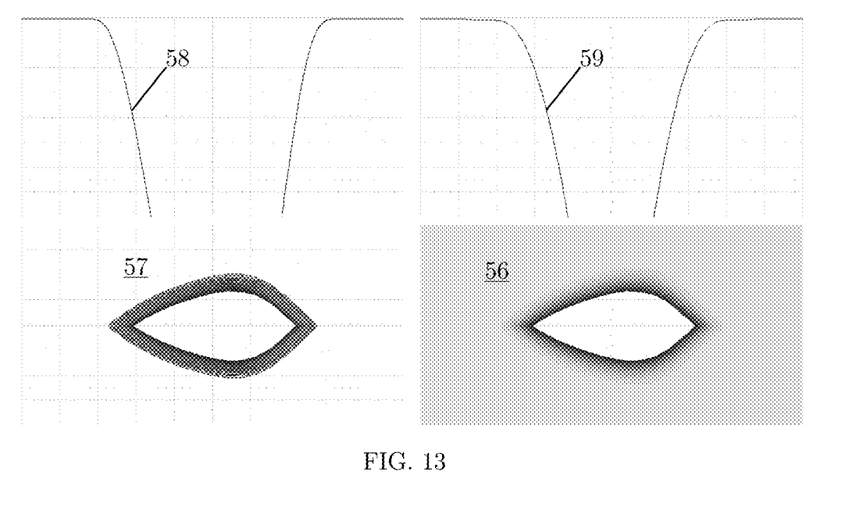
FIG. 13 is four plots containing a data centric iso-BER plot and a data centric contour plot along with a jitter bathtub curve and noise bathtub curve in accordance with an embodiment of the invention.

From the 2D CDF object [34] there are a number of different displays that may be provided. A contour plot may be made of the "signal centric" type as shown in FIG. 10. In this plot each line corresponds to a line of constant probability of the signal deviating from it's normal trajectory. The probabilities for 1.0e-6, 1.0 e-7, . . . 1.0e-15 are shown [53] for this particular exemplary embodiment of the invention. A method for generating such a plot, including determining the locations of the lines of constant probability, first an image of the 2D CDF object [34] is made [55] as shown in FIG. 11. The mostly continuous probabilities are then "terraced", whereby for a range of the variable K, each probability that is greater than or equal to 10', but less than $10^{-(K+1)}$ is reset to the value $10^{-K}$. Then each "pixel" in the displayed image which has a smaller value adjoining it becomes a line of constant probability. For the image [54] displayed in a particular exemplary embodiment of the invention, the range of K is 6 to 21 in steps of 1. Sometimes there may be too many lines too close together, so the steps can be increased as for [53] which shows the lines of constant probability for 1e-6, 1e-9, 1e-12 and 1e-15 (i.e. K=6, 9, 12 and 15). The most common contour plots in prior-art are displayed as data centric contours. That is they reflect the absolute probabilities that the signal under observation approaches the nominal sampling point of a digital receiver near the center of the eye. In FIG. 12 both the contour [56] and the display of lines of constant probability [57] are shown. These probabilities are closely related to the bit error ratio (BER) and so, often the [57] is called the IsoBER plot. A significant by-product of having these data centric contour plots, as is shown in FIG. 13, is obtained by producing a vertical slice noise bathtub curve [59] and horizontal slice jitter bathtub curve [58] across the data centric contour plot [56]. The jitter bathtub curve [58] is typically obtained from an analysis of jitter, yet apart from performing CDR to establish the start and end of each UI, no direct jitter analysis is traditionally performed. Using well known methods, in accordance with the various embodiments of the present invention, the provided inventive data sets can each be analyzed to obtain jitter decomposition for yielding total jitter (Tj), random jitter (Rj), deterministic jitter (Dj) and total noise (Tn), random noise (Rn), deterministic noise (Dn).

Figure 14:
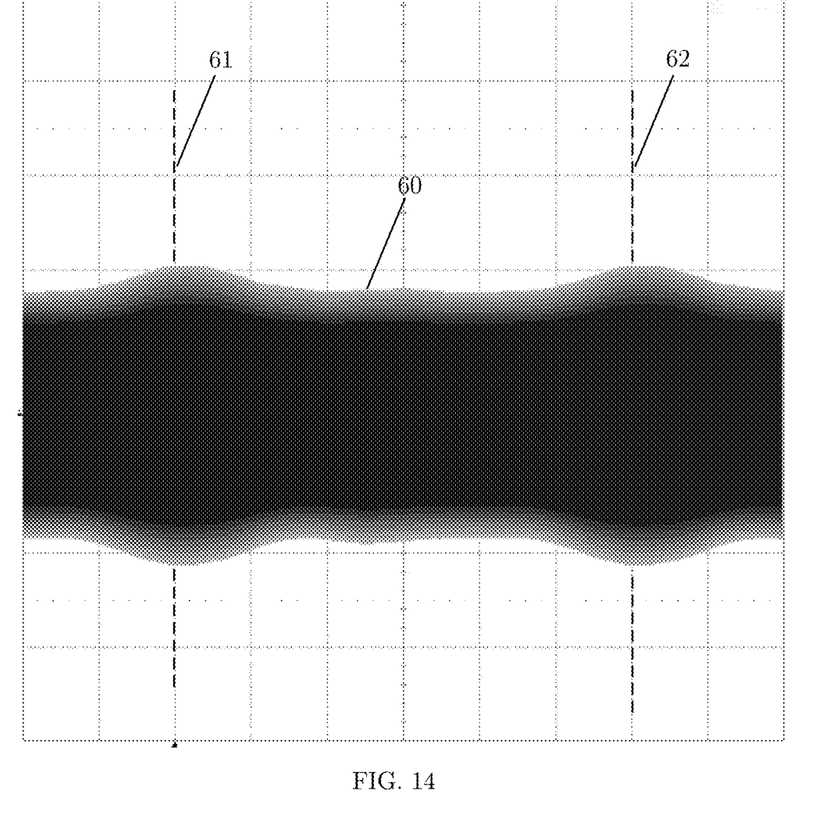
FIG. 14 is a flat CDF eye diagram in accordance with an embodiment of the invention.

Another display flat CDF eye [60] shown in FIG. 14, provided in accordance with yet another embodiment of the invention, is considered to be quite unusual by the inventors of the present invention, and is therefore considered to be quite useful and novel. Like all other eye diagrams this image represents behavior of the signal under observation over a region spanning somewhat more than one UI. For illustrative purposes the flat start of UI [61] and flat end of UI [62] are shown. As described in the procedure above, the 1-dimensional PDF's have been offset to have zero vertical mean. The consequence of this seemingly arbitrary choice, is to remove the trajectories for each category contributing to the 2D PDF object [33] and 2D CDF object [34]. By removing the means, or the mean trajectory, the remaining information shows only noise. This is extremely important for at least two reasons: 1) the bulges at flat start of UI [61] and flat end of UI [62] indicate a contribution to the measured noise that is caused by jitter and 2) any systematic crosstalk, as might be expected for a nearby data channel will manifest as a systematic bulge in this display-type. So this novel display type is useful to identify both jitter and crosstalk.

Figure 15:
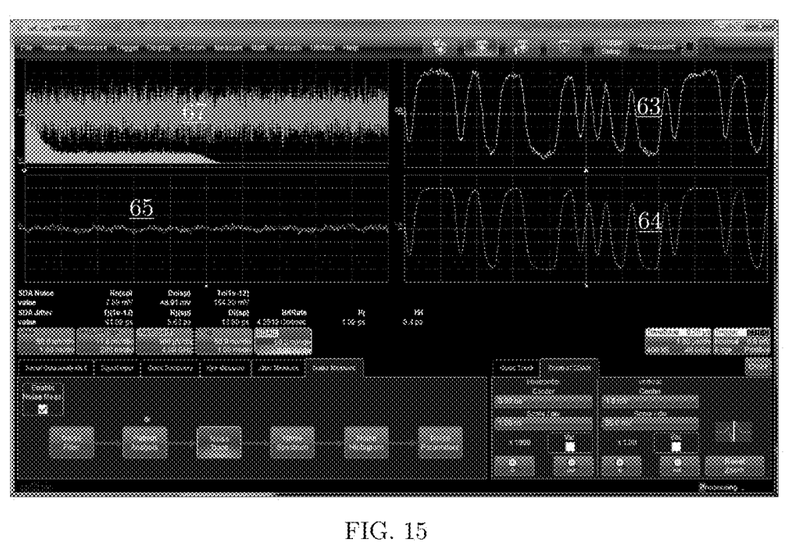
FIG. 15 is a plot showing the systematic waveform and residual waveform according to an embodiment of the present method.

Another line of analysis is shown in FIG. 15 and leverages the database of means by category [31] as well as the expected transition times [19] and [20] for the most recent [17] (and any number of subsequent acquisitions). For each data point of each input waveform [63] UI in the input waveform [63], the [20] may first be used to obtain a category. The database of means by category [31] for that category may then be further employed in conjunction with the expected transition times [19] to define the start and end of the UI. As a result, a new data point may be calculated for every data point in the input waveform [63] (with the exception of some points at the beginning and some at the end of the waveform lacking adequate surrounding points to identify a category) by interpolating from the database of means by category [31] for the category points at the same horizontal (time) coordinate. In this way, a new systematic waveform [64] is preferably created from which noise and jitter have been substantially removed. Subtracting this systematic waveform [64] from the input waveform [63] produces a residual waveform [65] which consists of only the non-systematic part of the waveform under analysis. This waveform can be analyzed to obtain spectrum of the residual waveform [66] of only the non-systematic part of the input waveform, which is a critical.

It should also be understood that the invention, while described generally as a set of method steps and resulting images, is equally applicable to a computer program stored to a non-transitory medium which, when run on a general purpose computer and processor, or other specialized hardware, such as an oscilloscope or other test and measurement apparatus, and including one or more of an acquisition channel, clock recovery module, processor, memory communication system and the like to support operation of the computer program. Therefore, the invention is equally applicable to a hardware system including a processor for allowing the system to perform the desired method steps. Furthermore, this system may be positioned locally, remotely, spread over multiple locations, and may include cloud or other remote computing systems and/or storage.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for generating a probability density function eye, comprising the steps of:
   acquiring, by an electronic measurement instrument, an input waveform;
   sampling, by the electronic measurement instrument, the input waveform to identify values for the input waveform at different times;
   performing, by the electronic measurement instrument, a clock data recovery process that analyzes the input waveform to determine one or more expected transition times in the input waveform;
   defining, by the electronic measurement instrument, a plurality of unit intervals of the input waveform in accordance with the one or more expected transition times;
   identifying, by the electronic measurement instrument, a set of data points in time for each of the plurality of unit intervals;
   determining, by the electronic measurement instrument, multiple values for a particular data point in time from the set of data points in time, with the multiple values for the particular data point in time being selected from among the plurality of unit intervals;
   generating, by the electronic test measurement instrument, a histogram of values for the particular data point in time using the multiple values for the particular data point in time that were selected from among the plurality of unit intervals;
   generating, by the electronic measurement instrument, a fit of the histogram of values generated for the particular data point in time and generating a probability density function for the particular data point in time using the fit of the histogram of values that was generated by the electronic measurement instrument; and displaying, by the electronic measurement instrument, a probability density function eye diagram that is based on the probability density function for the particular data point in time that was generated by the electronic measurement instrument using the fit of the histogram of values for the particular data point in time.

2. The method of claim 1, wherein the set of data points in time are determined by interpolation of the acquired input waveform.

3. The method of claim 1, wherein the acquired waveform is oversampled.

4. The method of claim 1, further comprising:
determining a category for each unit interval in accordance with its state and its position within the input waveform;
wherein the category for each unit interval is determined in accordance with a position of each unit interval in a recurring subsequence of the acquired waveform.

5. The method of claim 1, further comprising:
determining a category for each unit interval in accordance with its state and its position within the input waveform;
wherein the category for each unit interval is determined in accordance with the state of one or more other unit intervals in the acquired waveform.

6. The method of claim 1, further comprising:
generating, by the electronic test measurement instrument, multiple histograms of values for respective data points in time.

7. The method of claim 1, further comprising:
generating, by the electronic test measurement instrument, multiple histograms of values for respective data points in time and including one or more data points in time from one or more adjacent unit intervals.

8. The method of claim 1, further comprising determining a mean value of the histogram.

9. The method of claim 1, wherein generating the probability density function for the particular data point in time includes generating a two dimensional probability density function object.

10. The method of claim 5, wherein the one or more other unit intervals employed to determine the category for each unit interval comprise one or more adjacent unit intervals.

11. The method of claim 9, wherein displaying the probability density function eye diagram includes generating a two dimensional probability density function eye diagram in accordance with the two dimensional probability density function object.

12. The method of claim 9, wherein generating the two dimensional probability density function object further comprises:
performing the fit of the histogram to define a functional representation thereof;
for each column associated with the two dimensional probability density function object generating a probability density function in accordance with a set of functional representations comprising the defined functional representations for each histogram; and
summing the probability density functions for each column.

13. The method of claim 9, further comprising:
performing a fit of the histogram to define a functional representation thereof;
for each column associated with the two dimensional probability density function object generating a probability density function in accordance with a set of functional representations comprising the defined functional representations for each histogram; and
determining a cumulative distribution function in accordance with each probability density function;
summing the cumulative density functions for each column.

14. The method of claim 9, further comprising modifying the functional representation to compensate for noise.

15. The method of claim 13, further comprising slicing the two dimensional cumulative distribution object horizontally to obtain a jitter bathtub curve.

16. The method of claim 13, further comprising slicing the two dimensional cumulative distribution object vertically to obtain a noise bathtub curve.

17. The method of claim 15, wherein the compensated noise is noise inherent in a measuring instrument.

18. The method of claim 15, further comprising:
determining a mean value of the histogram; and
modifying the defined functional representation in accordance with the mean value.

* * * * *